US012601890B2

(12) United States Patent
Kato

(10) Patent No.: US 12,601,890 B2
(45) Date of Patent: Apr. 14, 2026

(54) LENS UNIT AND IN-VEHICLE CAMERA

(71) Applicant: Maxell, Ltd., Kyoto (JP)

(72) Inventor: Yasushi Kato, Kyoto (JP)

(73) Assignee: MAXELL, LTD., Kyoto (JP)

( * ) Notice: Subject to any disclaimer, the term of this patent is extended or adjusted under 35 U.S.C. 154(b) by 501 days.

(21) Appl. No.: 18/009,350

(22) PCT Filed: Jun. 9, 2021

(86) PCT No.: PCT/JP2021/021897
§ 371 (c)(1),
(2) Date: Dec. 9, 2022

(87) PCT Pub. No.: WO2021/251427
PCT Pub. Date: Dec. 16, 2021

(65) Prior Publication Data
US 2023/0152553 A1 May 18, 2023

(30) Foreign Application Priority Data

Jun. 12, 2020 (JP) ................................ 2020-102276

(51) Int. Cl.
*G02B 7/02* (2021.01)
*G03B 30/00* (2021.01)
(52) U.S. Cl.
CPC ............. *G02B 7/028* (2013.01); *G02B 7/021* (2013.01); *G03B 30/00* (2021.01)
(58) Field of Classification Search
CPC . G02B 7/02; G02B 7/00; G02B 7/021; G02B 7/022; G02B 7/026; G02B 7/025; G02B 7/028; G03B 30/00
See application file for complete search history.

(56) References Cited

U.S. PATENT DOCUMENTS

2015/0172521 A1* 6/2015 Yasukochi ............. G02B 7/021
                                                      29/525.01
2019/0148909 A1 5/2019 Kuroda et al.

FOREIGN PATENT DOCUMENTS

| JP | 2005-250348 A | 9/2005 |
|----|---------------|--------|
| JP | 2008-298968 A | 12/2008 |
| JP | 2016224388 A * | 12/2016 |

(Continued)

OTHER PUBLICATIONS

Machine translation of JP-2016224388-A (Year: 2016).*

(Continued)

*Primary Examiner* — Matthew Y Lee
(74) *Attorney, Agent, or Firm* — XSENSUS LLP

(57) ABSTRACT

A lens unit includes: a lens group in which a plurality of lenses are aligned along an optical axis of the lenses; a lens barrel that integrally supports the lens group; an intermediate ring; and an elastic member having an annular shape and provided between the lens and the intermediate ring, the lens being adjacent to the elastic member in the optical axis direction, and including a recess having an annular shape, the elastic member is provided in a compressed state, and the elastic member presses the lens disposed on an object side of the elastic member against an end portion of the lens barrel on the object side, presses the lens disposed on an image side of the elastic member against an end portion of the lens barrel on the image side via the intermediate ring, and absorbs rattling.

8 Claims, 2 Drawing Sheets

(56)                    References Cited

FOREIGN PATENT DOCUMENTS

| JP | 2019-90912 | A | | 6/2019 |
| JP | 2020-16687 | A | | 1/2020 |
| JP | 2020016687 | A | * | 1/2020 |

OTHER PUBLICATIONS

Machine translation of JP-2020016687-A (Year: 2020).*
Notice of Reasons for Refusal issued Sep. 24, 2024 in Japanese Patent Application No. 2020-102276 with English translation thereof.
International Search Report and Written Opinion mailed on Aug. 10, 2021, received for PCT Application PCT/JP2021/021897, filed on Jun. 9, 2021, 9 pages including English Translation.

* cited by examiner

LENS UNIT AND IN-VEHICLE CAMERA

CROSS-REFERENCE TO RELATED APPLICATIONS

The present application is based on PCT filing PCT/JP2021/021897, filed Jun. 9, 2021, which claims priority to JP 2020-102276, filed Jun. 12, 2020, the entire contents of each are incorporated herein by reference.

TECHNICAL FIELD

The present invention relates to a lens unit suitable for an in-vehicle camera to be mounted on a vehicle such as an automobile, and an in-vehicle camera.

BACKGROUND ART

In recent years, in-vehicle cameras have been mounted on automobiles to support parking and to prevent a collision by use of image recognition, and further applications for automated driving have been attempted.

An automobile is exposed to a cold or hot environment, and thus such an in-vehicle camera is similarly exposed to a severe temperature environment. Moreover, there is a possibility that an in-vehicle camera disposed on an outer side of the automobile is affected by cold wind or snow, or is brought into an overheated state by sunlight.

Hence, there is a demand for an in-vehicle camera to be usable stably from a low temperature to a high temperature while an automobile is being used, and various temperature countermeasures have been proposed (see, for example, Patent Literature 1).

In recent years, cameras have been incorporated into mobile telephones (smartphones) or the like, and thus there is a large demand for high-performance and low-cost cameras, and relatively inexpensive resin lenses are widely used.

Also for an in-vehicle camera, a member such as a lens made of resin or a lens barrel made of resin can be used. However, regarding an in-vehicle camera disposed outside the vehicle, there is a possibility that the temperature becomes low or high as described above, the in-vehicle camera is exposed to rain, snow, hail, or the like, or the in-vehicle camera is hit by a bounced stone, a falling object from an automobile, or the like. Therefore, in a case where durability is considered to be important, a glass lens and a lens barrel made of metal are adopted in many cases.

CITATION LIST

Patent Literature

Patent Literature 1: JP 2008-298968 A

SUMMARY OF INVENTION

Technical Problem

In a case of a camera with a certain level of high performance, by the way, a lens group including, for example, four or more lenses is used as lenses, and a plurality of lenses of the lens group are held to form a line with their optical axis directions being in alignment with one another in the lens barrel. In addition, an intermediate ring is provided to adjust an interval between the lenses in the optical axis direction, in some cases.

Further, in the lens barrel, for example, an outer circumferential surface of the lens or the intermediate ring is brought into contact with an inner circumferential surface of the lens barrel to be positioned in the radial direction, and the positions of the lens group on an object (subject) side and an image sensor side are regulated. The lens group is appropriately held in the lens barrel with being positioned in the optical axis direction. Therefore, the lenses of the lens group are stacked in the optical axis direction, and the individual lenses are not fixed to the lens barrel.

In a case where the lens barrel holds the lens group including such a plurality of lenses and the intermediate ring in alignment with one another in the optical axis direction, the length of the lens barrel along the optical axis direction becomes long. In a case where the lens barrel and the intermediate ring are made of metal having a relatively large expansion rate, the change amount in the length along the optical axis direction caused by a temperature change increases. In contrast thereto, the linear expansion coefficient of the glass lens is generally smaller than that of metal. For example, the elongation amount in the optical axis direction caused by a temperature rise of the lens barrel is larger than the elongation amount in the optical axis direction of the entire lens group. This causes a gap between the lenses of the lens group, and rattling occurs.

In this situation, a change in the lens interval or a state in which the lens is tilted to be inclined slightly (tilt) occurs. As a result, the optical performance is degraded.

The present invention has been made in view of the above circumstances, and has an object to provide a lens unit and an in-vehicle camera, which are capable of preventing rattling between lenses caused by a temperature change and suppressing a degradation in the optical performance.

Solution to Problem

In order to address the above issue, a lens unit according to the present invention includes: a lens group in which a plurality of lenses are aligned along an optical axis of the lenses; a lens barrel that integrally supports the lens group; an intermediate ring to be disposed between the lenses in at least one position of the lens group; and an elastic member having an annular shape and provided between the lens and the intermediate ring, the lens being adjacent to the elastic member in the optical axis direction, in which the lens adjacent to the elastic member in the optical axis direction includes a recess having an annular shape to be recessed in an outer circumferential portion in the optical axis direction, the elastic member is provided in a compressed state in the optical axis direction in the recess, and the elastic member presses the lens disposed on an object side of the elastic member against an end portion of the lens barrel on the object side, also presses the lens disposed on an image side of the elastic member against an end portion of the lens barrel on the image side via the intermediate ring, and absorbs rattling that occurs in association with a relative movement of the lens barrel and the lens group in the optical axis direction caused by a temperature change.

According to such a configuration, in a case where a gap along the optical axis direction occurs between the lenses of the lens group due to a difference in linear expansion coefficient between the lens barrel and the lens caused by a temperature rise, and rattling occurs, the elastic member presses the lens disposed on the object side of the elastic member against the end portion on the object side of the lens barrel, also presses the lens disposed on the image side of the elastic member against the end portion on the image side of the lens barrel via the intermediate ring, and thus absorbs the rattling.

Therefore, the rattling between the lenses caused by a temperature change can be prevented, and degradation in optical performance can be suppressed.

Note that the elastic member may be formed of rubber or a plate spring.

In addition, in the above configuration, another lens is provided between the lenses that sandwich the elastic member in the optical axis direction, and an outer circumferential portion of the another lens is bonded and fixed with the intermediate ring.

According to such a configuration, the outer circumferential portion of another lens is bonded and fixed with the intermediate ring. Thus, the intermediate ring enables such another lens to move to the image side of the lens barrel, and rattling does not occur at such another lens.

In addition, a lens unit according to the present invention includes: a lens group in which a plurality of lenses are aligned along an optical axis direction of the lenses; a lens barrel that integrally supports the lens group; and an elastic member having an annular shape and disposed between the lenses in at least one position of the lens group, in which the lenses that sandwich the elastic member in the optical axis direction have respective abutment surfaces in abutment with each other in parts of outer circumferential surfaces facing each other, one of the lenses that sandwich the elastic member in the optical axis direction includes a recess having an annular shape to be recessed in the optical axis direction on an outer circumferential surface on an outer circumferential side of the abutment surface, the elastic member is provided in a compressed state in the optical axis direction in the recess, and the elastic member presses the lens disposed on an object side of the elastic member against an end portion of the lens barrel on the object side, also presses the lens disposed on an image side of the elastic member against an end portion of the lens barrel on the image side, and absorbs rattling that occurs in association with a relative movement of the lens barrel and the lens group in the optical axis direction caused by a temperature change.

According to such a configuration, in a case where a gap along the optical axis direction occurs between the lenses of the lens group due to a difference in linear expansion coefficient between the lens barrel and the lens caused by a temperature rise, and rattling occurs, the elastic member presses the lens disposed on the object side of the elastic member against the end portion on the object side of the lens barrel, also presses the lens disposed on the image side of the elastic member against the end portion on the image side of the lens barrel, and thus absorbs the rattling.

Therefore, the rattling between the lenses caused by a temperature change can be prevented, and degradation in optical performance can be suppressed.

In addition, the lenses that sandwich the elastic member in the optical axis direction have the abutment surfaces that abut each other in parts of their outer circumferential surfaces facing each other. Therefore, the abutment surfaces are in abutment with each other, and thus rattling does not occur at the lenses at room temperature.

In addition, in the above configuration, the elastic member may be disposed at a position where sensitivity between surfaces is lowest among the plurality of lenses constituting the lens group, the sensitivity between the surfaces being sensitivity in image formation relative to a distance between lens surfaces.

According to such a configuration, the elastic member presses the lens disposed on the object side of the elastic member against the end portion on the object side of the lens barrel, and also presses the lens disposed on the image side of the elastic member against the end portion on the image side of the lens barrel. Therefore, even though a predetermined gap occurs between the lenses, the elastic member is disposed at a position where the sensitivity between the surfaces is the lowest, and thus degradation in optical performance can be suppressed.

An in-vehicle camera according to the present invention includes: the lens unit;

a substrate including an image sensor; and a support member that supports the lens unit in a state where the lens unit is positioned with respect to the substrate.

Advantageous Effects of Invention

According to the present invention, rattling between lenses caused by a temperature change can be prevented, and degradation in optical performance can be suppressed.

DESCRIPTION OF EMBODIMENTS

Hereinafter, embodiments of the present invention will be described with reference to the drawings.

A lens unit in the present embodiment is used for an in-vehicle camera, and is, for example, fixed and installed on an outer surface side of an automobile, and its wiring is drawn into the automobile to be connected with a display or other apparatuses.

First Embodiment

Figure 1:
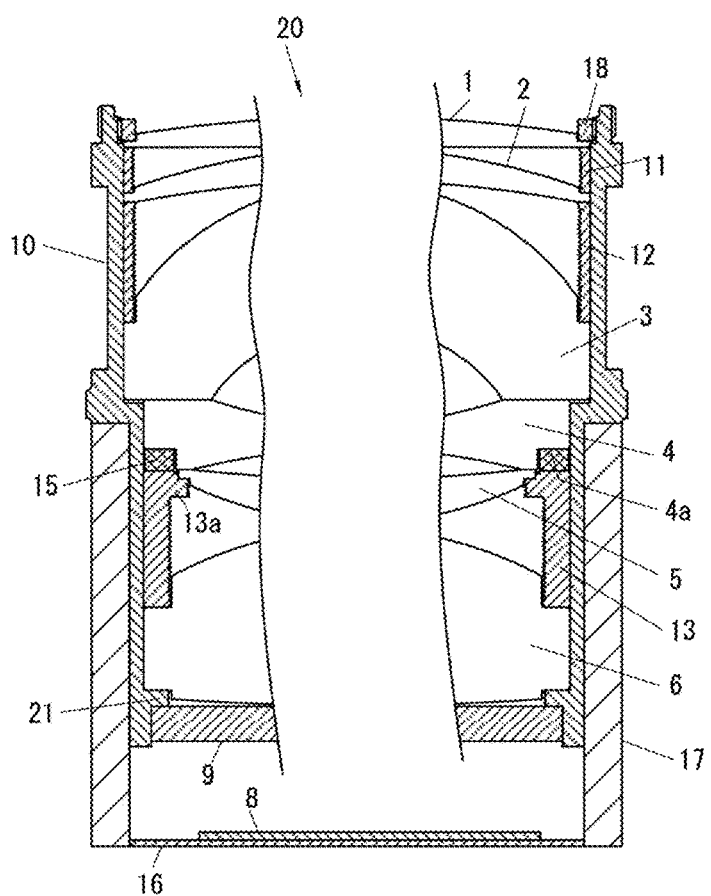
FIG. 1 is a cross-sectional view illustrating a lens unit of an in-vehicle camera according to a first embodiment of the present invention.

As illustrated in FIG. 1, a lens unit 20 of an in-vehicle camera in the present embodiment includes: a lens barrel 10 having a cylindrical shape; a plurality of (six) lenses 1, 2, 3, 4, 5, and 6 disposed in the lens barrel 10; an optical filter 9 disposed at an end portion on a (image-forming) side (a side on which an image sensor 8 is disposed) where the lenses 1, 2, 3, 4, 5, and 6 of the lens barrel 10 form an image; a press member 18, which presses the lens 1 in the lens barrel 10 at an end portion on an object side to be imaged; and three intermediate rings 11, 12, and 13, each of which functions as a spacer. Note that In FIG. 1 and FIG. 2 to be described later, an end portion on the object side is an upper end portion, and an end portion on the image side is a lower end portion.

The in-vehicle camera in the present embodiment includes: the above-described lens unit 20; a substrate 16, which includes the image sensor 8; a support member (mount) 17, which supports the lens barrel 10 in a state where the lens barrel 10 is positioned with respect to the substrate 16 including the image sensor 8; and an installation member, not illustrated, for installing the substrate 16 in an automobile.

Figure 2:
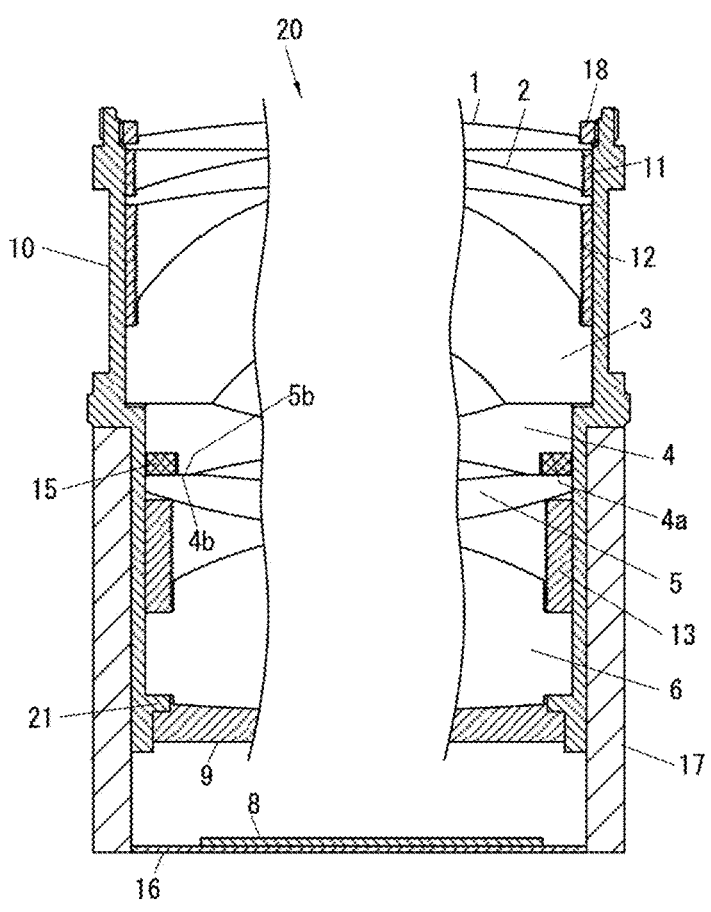
FIG. 2 is a cross-sectional view illustrating a lens unit of an in-vehicle camera according to a twentieth embodiment of the present invention.

Note that in FIG. 1 illustrating the present embodiment and FIG. 2 illustrating a second embodiment to be described later, hatching of lenses 1, 2, 3, 4, 5, and 5 constituting the lens unit 20 is omitted.

The plurality of lenses 1, 2, 3, 4, 5, and 6, which are fixed with and supported by the lens barrel 10, are disposed with their optical axes being in alignment with one another, and the lenses 1, 2, 3, 4, 5, and 6 are disposed along one optical axis to constitute one group that is a lens group 19 used for imaging. Therefore, in the following, in simply describing an optical axis, the optical axis of each of the lenses 1, 2, 3, 4, 5, and 6 will be indicated, and the optical axis of the lens group 19 will also be indicated.

The first intermediate ring 11 from the object side among the intermediate rings 11, 12, and 13 is disposed between the first lens 1 and the second lens 2, the lens 1 is in contact with an upper end portion of the intermediate ring 11, and the lens 2 is in contact with a lower end portion of the intermediate ring 11. The second intermediate ring 12 is disposed between the second lens 2 and the third lens 3, the lens 2 is in contact with an upper end portion of the intermediate ring 12, and the lens 3 is in contact with a lower end portion of the intermediate ring 12.

In addition, the third intermediate ring 13 is disposed between the fourth lens 4 and the sixth lens 6. Furthermore, an elastic member 15 is disposed between the fourth lens 4 and the third intermediate ring 13. Therefore, the elastic member 15 is in contact with an upper end portion of the intermediate ring 13, and the lens 6 is in contact with a lower end portion of the intermediate ring 13.

The lens 4, which is adjacent to the elastic member 15 in the optical axis direction, includes a recess 4a, which has an annular shape, and which is recessed in an outer circumferential portion in the optical axis direction. The elastic member 15 is provided in a compressed state in the optical axis direction in the recess 4a.

In addition, the position where sensitivity between surfaces, which is the sensitivity in image formation relative to a distance between lens surfaces of the plurality of lenses constituting the lens group 19, is the lowest between the lenses 4 and 5, and the elastic member 15 is provided between them. However, the lens 5 is smaller in diameter than the lens 4, and its outer circumferential portion is separated from the inner circumferential surface of the lens barrel 10. As described above, the recess 4a is provided in the outer circumferential portion of the lens 4, and the elastic member 15 is provided in the recess 4a.

In the present embodiment, the elastic member 15 includes an annular wave spring (wave washer) made of metal. The wave spring, for example, has a disk shape, has an annular shape with a hole in the central portion, and has a wavy shape along the circumferential direction, as the position along the axial direction orthogonal to the disk changes depending on the position in the circumferential direction.

Such an elastic member 15 elastically presses the lenses 1, 2, 3, and 4 disposed on the object side of the elastic member 15 against the press member 18 provided at an end portion on the object side of the lens barrel 10, and also presses the lens 6 disposed on the image side of the elastic member 15 against an inner flange portion 21 provided at an end portion on the image side of the lens barrel 10 via the intermediate ring 13, and thus absorbs rattling that occurs in association with a relative movement in the optical axis direction of the lens barrel 10 and the lens group 19 caused by a temperature change (for example, a temperature change from a normal temperature to a high temperature).

In addition, an inner flange portion 13a is provided at an end portion on the object side of the intermediate ring 13, and an outer circumferential portion of the lens (another lens) 5 is bonded and fixed with the inner flange portion 13a. Therefore, the lens 5 is supported by the intermediate ring 13, and moves to the image side together with the intermediate ring 13, when the elastic member 15 presses and moves the intermediate ring 13 to the image side.

In the lens barrel 10, a male screw portion is formed on the outer circumference of an end portion on the object side, a female screw portion formed on the inner circumference of the press member 18 having an annular shape is screwed to such a male screw portion, and the press member 18 is fixed to an end portion on the object side of the lens barrel 10. The six lenses 1, 2, 3, 4, 5, and 6, the three intermediate rings 11, 12, and 13, and the elastic member 15 are disposed with being sandwiched between the press member 18 and the inner flange portion 21, which is provided at an end portion on the image side of the lens barrel 10. Note that a predetermined number of diaphragm members each having a disk shape may be provided at predetermined positions between the press member 18 and the inner flange portion 21.

In addition, the lens barrel 10 is joined with an inner circumferential surface of the support member 17, and is supported by the support member 17. Further, the support member 17 is formed in a substantially cylindrical shape, the lens barrel 10 is disposed in its inside, and the outer circumferential side of the lens barrel 10 and the inner circumferential side of the support member 17 are joined with each other. Further, an end portion on the image sensor 8 side of the support member 17 is fixed with the substrate 16, on which the image sensor 8 is mounted. Accordingly, the support member 17 supports the lens unit 20 including the lens barrel 10 with the lens unit 20 being positioned with respect to the image sensor 8.

In addition, in the present embodiment, the lenses 1 to 6 are made of glass, for example, so-called optical glass, and the lens barrel 10 and the intermediate rings 11 to 13 are each made of metal, for example, an aluminum alloy.

In the lens unit 20 and the in-vehicle camera, as described above, the six lenses 1, 2, 3, 4, 5, and 6, the three intermediate rings 11, 12, and 13, and the elastic member 15 are disposed with being sandwiched between the press member 18 and the inner flange portion 21 at the end portion on the image side of the lens barrel 10.

In such an in-vehicle camera, a usable temperature range is preferably wide. For example, it can be preferably used in a range of −40° C. to 105° C. In this case, for example, in a case where a design is based on 25° C. that is within a range of normal temperature, when the temperature rises, even though it is within a range up to 105° C., a difference occurs between a change amount due to thermal expansion of the total lengths along the optical axis direction of the lenses 1, 2, 3, 4, 5, and 6 and the three intermediate rings 11, 12, and 13 disposed in a stacked manner and a change amount due to thermal expansion of the length along the optical axis direction of the lens barrel 10 (the length from the press member 18 to the inner flange portion 21), and a gap occurs between the lenses 1 to 6.

In this case, a gap is generated among the lenses 1, 2, 3, 4, 5, and 6 of the lens group 19, a gap is generated among the respective lenses 1, 2, 3, 4, 5, and 6 along the optical axis direction, and rattling occurs in some cases. In this case, the elastic member 15 presses the lenses 1, 2, 3, and 4 disposed on the object side of the elastic member 15 against the press member 18 at an end portion on the object side of the lens barrel 10, also presses the lens 6 disposed on the image side of the elastic member 15 against the inner flange portion 21 disposed at an end portion on the image side of the lens barrel 10 via the intermediate ring 13, and thus absorbs the rattling.

Therefore, the rattling between the lenses caused by a temperature change can be prevented, and degradation in optical performance can be suppressed.

In addition, the outer circumferential portion of the lens 5 is bonded and fixed with the inner flange portion 13*a* of the intermediate ring 13. Thus, the intermediate ring 13 enables the lens 5 to move to the image side of the lens barrel, and rattling does not occur at the lens 5.

Note that, in the present embodiment and a second embodiment to be described later, the lenses 1, 2, 3, 4, 5, and 6 are made of glass, and the lens barrel 10 is made of metal. However, even though these are made of resin, the present invention is applicable, in a case where a difference in thermal expansion coefficient due to a difference in material or the like generates a difference between a displacement amount due to the thermal expansion of the lens group 19 and a displacement amount due to the thermal expansion of the lens barrel 10 as described above.

Second Embodiment

Next, a second embodiment of the present invention will be described with reference to FIG. 2.

The lens unit 20 in the second embodiment is different from that in the first embodiment in that the fifth lens 5 is larger in diameter than the lens 5 in the first embodiment. Therefore, in the following, this point and its peripheral part will be described, and the same components as those in the first embodiment are denoted by the same reference numerals, and the descriptions will be omitted.

As illustrated in FIG. 2, in the present embodiment, the lens 5 is larger in diameter than the lens 5 in the first embodiment, its outer circumferential surface is in contact with an inner circumferential surface of the lens barrel 10, and the curvatures of the upper surface and the lower surface of the lens 5 are larger than the curvatures of the upper surface and the lower surface of the lens 5 in the first embodiment.

In addition, the lenses 4 and 5, which sandwich the elastic member 15 in the optical axis direction, have respective abutment surfaces 4*b* and 5*b* in abutment with each other in parts of their outer circumferential surfaces facing each other, and these abutment surfaces 4*b* and 5*b* are in abutment with each other.

The abutment surface 4*b* is provided on an inner side in the radial direction with respect to the recess 4*a*, and is a flat surface orthogonal to the optical axis direction. The abutment surface 5*b* is a flat surface orthogonal to the optical axis direction, faces the abutment surface 4*b*, extends to the inner circumferential surface of the lens barrel 10, and is in abutment with the elastic member 15.

The elastic member 15 is provided in a compressed state in the optical axis direction in the recess 4*a*. The position where sensitivity between surfaces, which is the sensitivity in image formation relative to a distance between lens surfaces of the plurality of lenses constituting the lens group 19, is the lowest between the lenses 4 and 5, and the elastic member 15 is provided between them.

In addition, the outer circumferential surface of the lens 5 is in contact with the inner circumferential surface of the lens barrel 10. Therefore, the intermediate ring 13 does not have an inner flange portion unlike the intermediate ring 13 in the first embodiment, and the lens 5 is in abutment with an upper end portion of the intermediate ring 13.

In the lens unit 20 and the in-vehicle camera, as described above, the six lenses 1, 2, 3, 4, 5, and 6, the three intermediate rings 11, 12, and 13, and the elastic member 15 are disposed with being sandwiched between the press member 18 and the inner flange portion 21 at the end portion on the image side of the lens barrel 10.

In such an in-vehicle camera, a usable temperature range is preferably wide as in the first embodiment. For example, it can be preferably used in a range of −40° C. to 105° C. In this case, for example, in a case where a design is based on 25° C. that is within a range of normal temperature, when the temperature rises, even though it is within a range up to 105° C., a difference occurs between a change amount due to thermal expansion of the total lengths along the optical axis direction of the lenses 1, 2, 3, 4, 5, and 6 and the three intermediate rings 11, 12, and 13 disposed in a stacked manner and a change amount due to thermal expansion of the length along the optical axis direction of the lens barrel 10 (the length from the press member 18 to the inner flange portion 21), and a gap occurs between the lenses 1 to 6.

In this case, a gap is generated among the lenses 1, 2, 3, 4, 5, and 6 of the lens group 19, a gap is generated among the respective lenses 1, 2, 3, 4, 5, and 6 along the optical axis direction, and rattling occurs in some cases. In this case, the elastic member 15 presses the lenses 1, 2, 3, and 4 disposed on the object side of the elastic member 15 against the press member 18 at an end portion on the object side of the lens barrel 10, also presses the lenses 5 and 6 disposed on the image side of the elastic member 15 against the inner flange portion 21 disposed at an end portion on the image side of the lens barrel 10, and thus absorbs the rattling.

Therefore, the rattling between the lenses caused by a temperature change can be prevented, and degradation in optical performance can be suppressed.

In addition, the lenses 4 and 5, which sandwich the elastic member 15 in the optical axis direction, have the respective abutment surfaces 4*b* and 5*b* in abutment with each other in parts of their outer circumferential surfaces facing each other. Therefore, the abutment surfaces 4*b* and 5*b* are in abutment with each other, and thus rattling does not occur at the lenses 4, 4 at room temperature.

Note that from the viewpoint of ensuring reliability, in the present embodiment described above, an annular wave spring (wave washer) made of metal is used as the elastic member 15. However, an O-ring made of resin may be used, in a case where the degree of requirement for the reliability is low. This is because the O-ring made of resin also has defects such as a change in expansion due to temperature and degradation over time in elastic force.

REFERENCE SIGNS LIST

10 Lens barrel
1, 2, 3, 4, 5, 6 Lens
4*a* Recess
4*b*, 5*b* Abutment surface
8 Image sensor
11, 12, 13 Intermediate ring
15 Elastic member
16 Substrate
17 Support member
19 Lens group
20 Lens unit

The invention claimed is:

1. A lens unit comprising: a lens group in which a plurality of lenses are aligned along an optical axis direction of the lenses; a lens barrel that integrally supports the lens group; and an annular elastic member disposed between the lenses in at least one position of the lens group and in contact with both of the lenses, wherein the lenses that sandwich the annular elastic member in the optical axis direction have respective abutment surfaces in abutment with each other in parts of outer circumferential surfaces facing each other, one of the lenses that sandwich the annular elastic member in the optical axis direction includes a recess having an annular shape to be recessed in the optical axis direction on an outer circumferential surface on an outer circumferential side of the abutment surface, the annular elastic member is provided in a compressed state in the optical axis direction in the recess, and the annular elastic member presses all the lenses disposed on an object side of the annular elastic member toward an end portion of the lens barrel on the object side, also presses all the lenses disposed on an image side of the annular elastic member toward an end portion of the lens barrel on the image side, and thus absorbs rattling that occurs in association with a relative movement of the lens barrel and the lens group in the optical axis direction caused by a temperature change.

2. The lens unit according to claim 1, wherein the annular elastic member is disposed at a position where sensitivity between surfaces is lowest among the plurality of lenses constituting the lens group, the sensitivity between the surfaces being sensitivity in image formation relative to a distance between lens surfaces.

3. An in-vehicle camera comprising:

the lens unit according to claim 1;

a substrate including an image sensor; and a support member that supports the lens unit in a state where the lens unit is positioned with respect to the substrate.

4. The lens unit according to claim 1, wherein the respective abutment surfaces of the lenses in abutment with each other include a first respective abutment surface and a second respective abutment surface.

5. The lens unit according to claim 4, wherein the first respective abutment surface is a flat surface orthogonal to the optical axis direction.

6. The lens unit according to claim 5, wherein the second respective abutment surface is a flat surface orthogonal to the optical axis direction.

7. The lens unit according to claim 4, wherein the first respective abutment surface is provided on a radial inner side with respect to the recess of the one of the lenses that sandwich the annular elastic member.

8. The lens unit according to claim 1, wherein the one of the lenses that sandwich the annular elastic member has an outer circumferential surface that is in contact with an inner circumferential surface of the lens barrel.

* * * * *